(12) United States Patent  
Shinojima

(10) Patent No.: US 9,551,889 B2  
(45) Date of Patent: Jan. 24, 2017

(54) DISPLAY MODULE

(71) Applicant: Japan Display Inc., Tokyo (JP)

(72) Inventor: Kazumoto Shinojima, Tokyo (JP)

(73) Assignee: Japan Display Inc., Tokyo (JP)

( * ) Notice: Subject to any disclaimer, the term of this patent is extended or adjusted under 35 U.S.C. 154(b) by 99 days.

(21) Appl. No.: 14/202,899

(22) Filed: Mar. 10, 2014

(65) Prior Publication Data

US 2014/0267973 A1 Sep. 18, 2014

(30) Foreign Application Priority Data

Mar. 13, 2013 (JP) ................................. 2013-050760

(51) Int. Cl.
*G02F 1/1333* (2006.01)
*G02F 1/1335* (2006.01)
*G02B 27/01* (2006.01)

(52) U.S. Cl.
CPC ... *G02F 1/133308* (2013.01); *G02F 1/133512* (2013.01); *G02B 27/01* (2013.01); *G02B 2027/015* (2013.01); *G02B 2027/0118* (2013.01); *G02F 2001/133314* (2013.01); *G02F 2202/28* (2013.01)

(58) Field of Classification Search
CPC ............................................... G02F 1/133308
See application file for complete search history.

(56) References Cited

U.S. PATENT DOCUMENTS

2007/0047225 A1 * 3/2007 Sudo ................. G02F 1/133604  
362/225  
2011/0292318 A1 * 12/2011 Nakamoto et al. ............. 349/62

FOREIGN PATENT DOCUMENTS

| JP | 2008233455 A | * 10/2008 |
| JP | 2010-197749 | 9/2010 |
| JP | 2010-230963 | 10/2010 |
| JP | 2010244804 A | * 10/2010 |
| JP | 2013-041077 | 2/2013 |

OTHER PUBLICATIONS

Japanese Office Action issued Mar. 1, 2016 in corresponding Japanese Application No. 2013-050760.

* cited by examiner

*Primary Examiner* — Paisley L Arendt  
*Assistant Examiner* — Edmond Lau  
(74) *Attorney, Agent, or Firm* — K&L Gates LLP

(57) ABSTRACT

A display module includes a display panel configured to display an image on a display surface, a frame having a shape configured to surround an outer edge of the display panel and having an opening formed in a region overlapping the display surface, and a holding member having an inner region that is a region closer to a center of the display panel and an outer region that is a region farther from the center of the display panel, the inner region being connected to the display panel, the outer region being connected to the frame, and the inner region being separated from the outer region in a view projected from a direction orthogonal to the display surface.

6 Claims, 3 Drawing Sheets

DISPLAY MODULE

CROSS REFERENCES TO RELATED APPLICATIONS

The present application claims priority to Japanese Priority Patent Application JP 2013-050760 filed in the Japan Patent Office on Mar. 13, 2013, the entire content of which is hereby incorporated by reference.

BACKGROUND

1. Field of the Invention

The present invention relates to a display module including a display panel and a support member supporting the display panel.

2. Description of the Related Art

A display device for displaying an image displays the image on a display surface provided on a display panel such as liquid crystal display panel (hereinafter, also may be called "LCD panel") or organic EL panel. The display panel is a plate-like member and the outer periphery of the display panel is supported by another member.

For example, an LCD device described in Japanese Patent Application Laid-open Publication No. 2010-197749 (JP-A-2010-197749) includes a liquid crystal panel and a backlight arranged to face a back surface side of the liquid crystal panel. The liquid crystal panel is supported in a state of being sandwiched between a bezel and a frame, and the backlight is accommodated in a backlight chassis. A polarization plate is superimposed on the back surface side of the liquid crystal panel and a double-faced tape is attached to the entire periphery of the polarization plate. A sealing sheet is provided to be bonded to the double-faced tape so as to cover the polarization plate on the back surface side with the sealing sheet.

In the display device, a display module including a display panel and a frame that supports the display panel is often formed thinner and lighter in weight for the purpose of forming the display device thinner and lighter in weight. In this case, if a supporting structure of sandwiching the display panel between a bezel and the frame is adopted as in the device described in JP-A-2010-197749, the supporting structure is provided outside of both surfaces, that is, the display surface of the display panel on which the image is displayed and a surface opposite to the display surface (the back surface). This imposes limitations on the purpose of forming the device thinner.

To deal with this problem, the display panel can be fixed to the frame by fixedly bonding the display panel to the frame with a double-faced tape or the like. However, the frame possibly deforms due to fastening or the like at the time of fixing the frame to housing or the like of the display device. If the display panel is fixedly bonded to the frame with the double-faced tape or the like and then the frame deforms, there is a possibility that the display panel deforms to change a cell thickness and that unevenness in display occurs. The frame may be warped due to an error or the like during manufacturing. If the frame is warped, a gap is generated between the frame and the display panel, and light leakage possibly occurs from the gap.

SUMMARY

It is an object of the present invention to at least partially solve the problems in the conventional technology.

There is disclosed a display module including a display panel configured to display an image on a display surface, a frame having a shape configured to surround an outer edge of the display panel and having an opening formed in a region overlapping the display surface, and a holding member having an inner region that is a region closer to a center of the display panel and an outer region that is a region farther from the center of the display panel, the inner region being connected to the display panel, the outer region being connected to the frame, and the inner region being separated from the outer region in a view projected from a direction orthogonal to the display surface.

The above and other objects, features, advantages and technical and industrial significance of this invention will be better understood by reading the following detailed description of presently preferred embodiments of the invention, when considered in connection with the accompanying drawings.

The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

Additional features and advantages are described herein, and will be apparent from the following Detailed Description and the figures.

DETAILED DESCRIPTION

The present disclosure will now be described according to the following orders and with reference to the accompanying drawings.

Figure 1:
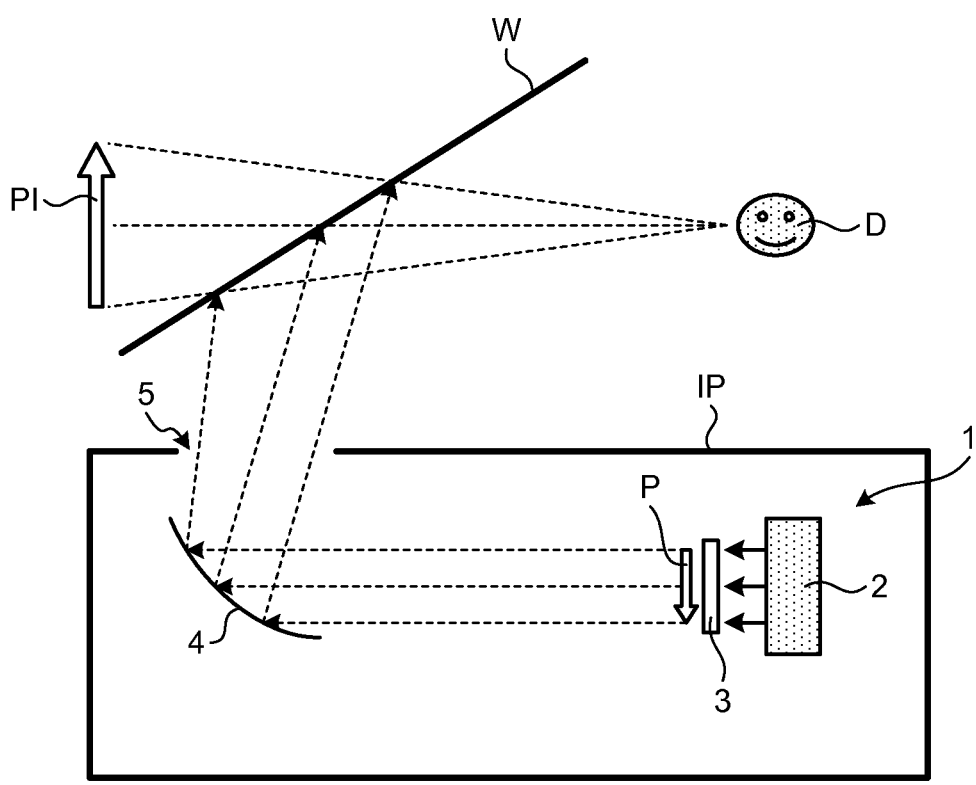
FIG. 1 is a schematic diagram illustrating a display device according to an embodiment of the present invention.

1. Display Device
1-1. General Configuration
1-2. Details of LCD Module
2. Configuration of Present Disclosure
[1. Display Device]
<1-1. General Configuration>
FIG. 1 is a schematic diagram illustrating a display device according to an embodiment of the present disclosure. An explanation is made on a case where a display module according to the present embodiment is employed in a display device 1. The display device 1 is a head-up display which is mounted on a vehicle such as car, bus, and truck or the like, and which displays information on a front window W of the vehicle, the information such as environmental situation, traveling direction, and speed of the vehicle. The use of the display device 1 enables a vehicle driver D to visually recognize the information displayed on the front window W while hardly turning his/her eyes away from the foreground.

The display device 1 is accommodated in a front panel IP of the vehicle. The display device 1 includes a light source 2, an LCD module 3, and a mirror 4. For example, the light source 2 is an LED (light Emitting Diode) but is not limited to the LED.

Figure 2:
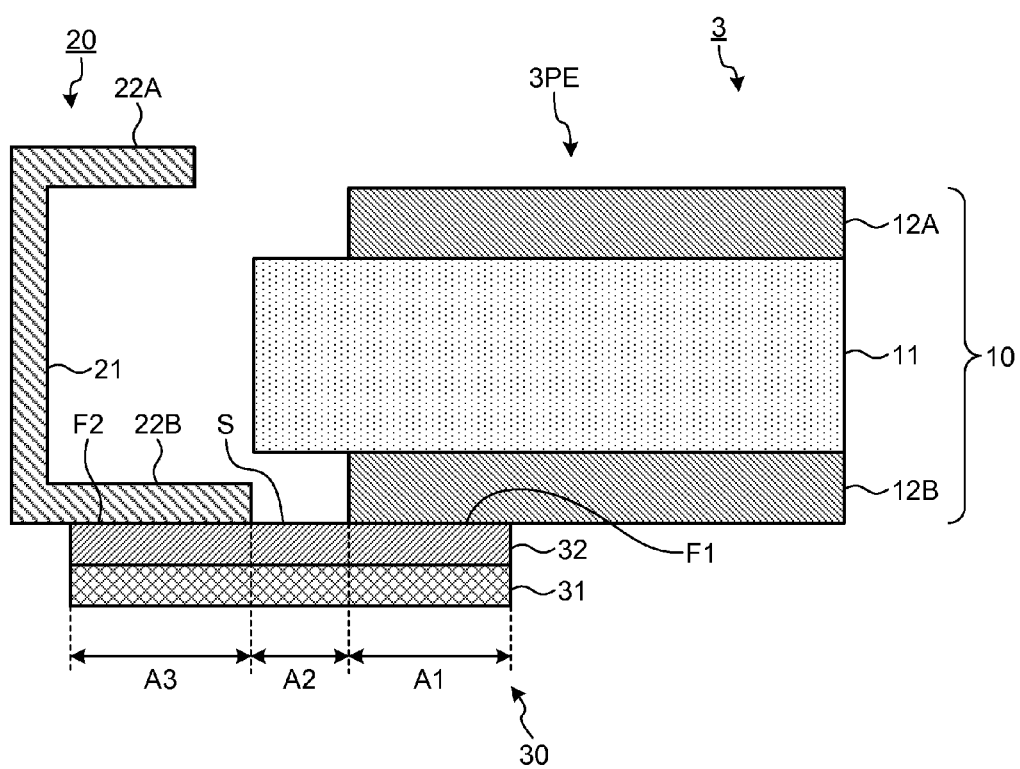
FIG. 2 is a cross-sectional view illustrating an LCD module included in the display device according to the present embodiment.

FIG. 2 is a cross-sectional view illustrating the LCD module included in the display device according to the present embodiment. The LCD module 3 includes a display surface 3PE on which an image P is displayed. The mirror 4 is a concave mirror. Light emitted from the display surface 3PE of the LCD module 3 reaches the mirror 4 and projects the image P. The display device 1 includes an opening 5 at a position facing the mirror 4.

The image P projected by the LCD module 3 is reflected by the mirror 4, passed through the opening 5, and projected on the front window W. The mirror 4 magnifies the image P and projects the magnified image P on the front window W. The driver D visually recognizes a virtual image PI of the image P projected by the LCD module 3 through the front window W.

<1-2. Details of LCD Module>

(Configuration of LCD Module)

Figure 3:
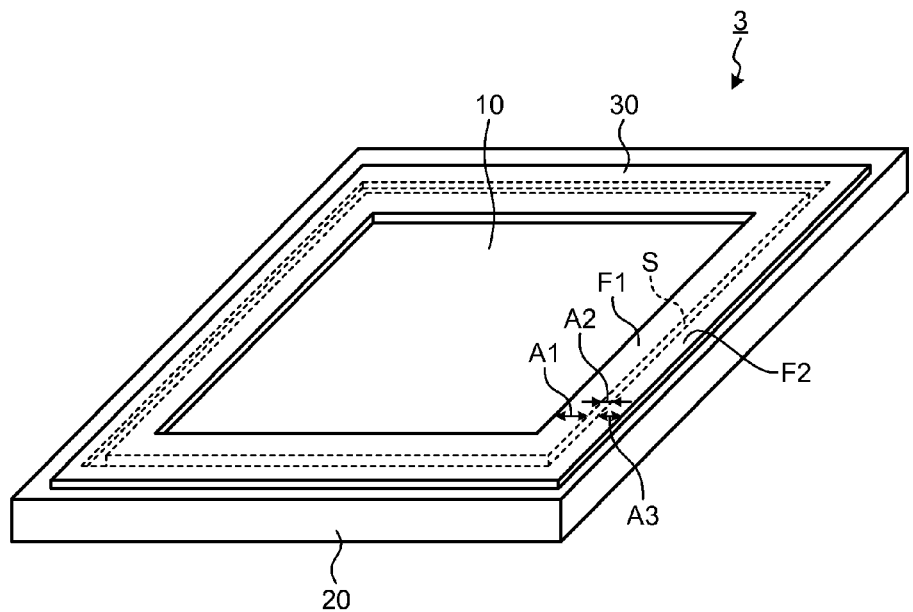
FIG. 3 is a perspective view illustrating the LCD module.

The LCD module 3 will now be described. FIG. 2 is a cross-sectional view illustrating the LCD module employed in the display device according to the present embodiment. FIG. 3 is a perspective view illustrating the LCD module. FIG. 2 illustrates a cross-section obtained by cutting off neighborhoods of an end portion of the display surface of the LCD module 3. FIG. 2 illustrates the cross-section in such a direction that a surface on the display surface 3PE side of the LCD module 3 is located on an upper side in FIG. 2 and that a surface on the light source 2 side of the LCD module 3 is located on a lower side in FIG. 2. FIG. 3 illustrates a state where the LCD module 3 is viewed from the surface opposite to the display surface 3PE, that is, from the side of the light source 2. In a view of the LCD module 3 projected from a direction orthogonal to the display surface, a direction toward a center of an LCD panel 10 (that is, a center of the display surface 3PE) is referred to as "inner direction" and a direction away from the center of the LCD panel 10 (that is, the center of the display surface 3PE) is referred to as "outer direction". In a case of a cross-section of the LCD module 3, a direction toward the center of the LCD panel 10, that is, the center of the display surface 3PE is referred to as "inner direction" in the cross-section and a direction away from the center of the LCD panel 10, that is, the center of the display surface 3PE is referred to as "outer direction" in the cross-section.

As illustrated in FIGS. 2 and 3, the LCD module 3 includes the LCD panel 10 on which the image P is displayed, a frame 20 disposed around the LCD panel 10 and protecting the LCD panel 10, and a holding member 30 connecting the LCD panel 10 to the frame 20.

The LCD panel 10 includes a substrate unit 11 on which the image is displayed, and a pair of polarization plates 12A and 12B disposed on surfaces of the substrate unit 11, respectively, so that the substrate unit 11 is sandwiched between these polarization plates 12A and 12B. The substrate unit 11 includes two substrates and a liquid crystal layer disposed between these two substrates. These two substrates of the substrate unit 11 are provided with wirings, electrodes, color filters and the like which are formed corresponding to a plurality of pixels. The substrate unit 11 switches a polarization state of light of each pixel by controlling a voltage applied to the wiring and/or electrode corresponding to each pixel and by controlling an electric field corresponding to each pixel and generated on the liquid crystal layer.

In the LCD panel 10, electric voltage is applied to align or orient the liquid crystal so that light in a specific direction is transmitted. Thereby, it is switched whether the light traveling through the polarization plate 12B, the substrate unit 11, and the polarization plate 12A in this order is transmitted through the polarization plate 12A. The LCD panel 10 can thereby output the light of the image P. As the LCD panel 10, various types of LCD displays such as FFS (Fringe Field Switching) type, IPS (In-Plane Switching) type, TN (Twisted Nematic) type, OCB (Optically Compensated Bend, Optically Compensated Birefringence) type, and ECB (Electrically Controlled Birefringence) type can be used. That is, it suffices that the LCD panel 10 can display an image, and various types of circuit configurations and liquid crystal configurations can be used as a circuit configuration of circuits and a liquid crystal configuration of the liquid crystals formed on the substrate unit 11.

As illustrated in FIG. 3, in the LCD module 3, the display surface of the LCD panel 10 on which the image P is displayed is square.

The frame 20 is a member that supports the LCD panel 10 through the holding member 30. The frame 20 is disposed or arranged on an outer side of the LCD panel 10. That is, the LCD panel 10 is disposed or arranged on the inner side. An opening is formed at a center of the frame 20 and the frame 20 is disposed or arranged entirely on outer sides of side surfaces of the LCD panel 10 (an outer edge of the display surface). That is, the frame 20 is a frame with the opening formed on the inner side. The display surface of the LCD panel 10 and a surface opposite to the display surface are in a state of being exposed through the opening of the frame 20. In a projected view from the direction orthogonal to the display surface, a shape of each of an outer edge (an outer end portion) and an inner edge (an inner end portion) of the frame 20 is square similarly to the LCD panel 10. The frame 20 may be formed of metal, resin or the like. For example, a stainless steel may be used as the metal from which the frame is made. It is preferable that the frame 20 is formed of a high rigidity material. Accordingly, the frame 20 can appropriately support the LCD panel 10 and protect the LCD panel 10 from an external stress and the like.

The frame 20 includes a wall portion 21 facing the side surfaces of the LCD panel 10, a folded portion 22A connected to the wall portion 21 on the side of the mirror 4 (an upper side in FIG. 2) and protruding toward the side surfaces (the inner side) of the LCD panel 10, and a folded portion 22B connected to the wall portion 21 on the side of the light source 2 (a lower side in FIG. 2) and protruding toward the side surfaces of the LCD panel 10. That is, the frame 20 has a shape in which the folded portions 22A and 22B protruding toward the LCD panel 10 are connected to both ends of the wall portion 21, respectively, that is, the frame 20 has a U-shape in which three sides are connected by lines and which is open toward the LCD panel 10. A length of the wall portion 21 according to the present embodiment in the direction orthogonal to the display surface is either equal to or larger than that of the LCD panel 10. An end portion of the folded portion 22A on the LCD panel 10 side is located on an outer side than the outer edge of the display surface of the LCD panel 10. That is, a certain gap is formed between the folded portion 22A and the display surface. An end portion of the folded portion 22B on the LCD panel 10 side is located on an outer side than the outer edge of the surface opposite to the display surface of the LCD panel 10. That is, a certain gap is formed between the folded portion 22B and the surface opposite to the display surface.

The holding member 30 is connected to a surface of the folded portion 22B on the light source 2 side of the frame 20 and to a surface of the polarization plate 12B on the light source 2 side of the LCD panel 10, and connects the frame 20 to the LCD panel 10. That is, the holding member 30 is connected to the frame 20 and the LCD panel 10 at their surfaces on the light source 2 side. As illustrated in FIG. 3, in the projected view from the direction orthogonal to the display surface, the holding member 30 is disposed or arranged on the entire periphery of the outer end portion (the outer edge) of the LCD panel 10 and the entire periphery of the inner end portion (the inner edge) of the frame 20. An opening is formed on the inner side of the holding member 30 and an outer end portion of the holding member 30 is located on an inner side than the outer end portion of the frame 20. The holding member 30 is thereby provided as a square sheet-shaped member having the square opening formed on the inner side.

The holding member 30 includes a light-blocking film 31 and a double-faced tape 32. The light-blocking film 31 is a film having a light blocking effect and elasticity or stretching property. The light-blocking film 31 is made of a resin or the like having the light blocking effect and the elasticity. For example, the light-blocking film 31 is made of a black PET film having a high light blocking effect. The light-blocking film 31 can be obtained by performing a treatment for providing the light blocking effect on a film made of an elastic material.

The double-faced tape 32 is a sheet-shaped member having surfaces to which an adhesive agent or a pressure sensitive adhesive agent (tackiness agent) is applied. The double-faced tape 32 is disposed on a surface of the holding member 30 on the mirror 4 side, that is, a surface of the holding member 30 facing the LCD panel 10 and the frame 20. The double-faced tape 32 is bonded to the holding member 30, the LCD panel 10, and the frame 20 so that the holding member 30 is connected to the LCD panel 10 and the frame 20.

For example, the holding member 30 can be fabricated by attaching the double-faced tape 32 to the light-blocking film 31, which has been formed into a rolled state, and then punching the light-blocking film 31 with the double-faced tape 32 attached thereon into a frame shape using a die.

An inner region F1 included in a range A1 that includes an inner edge of the double-faced tape 32 out of the surface of the holding member 30 facing the LCD panel 10 and the frame 20, that is, the surface on the mirror 4 side contacts the polarization plate 12B of the LCD panel 10 and is connected (bonded) to the polarization plate 12B. In the projected view from the direction orthogonal to the display surface 3PE, the inner region F1 is a region of the holding member 30 closer to the center of the LCD panel 10. A gap S included in a range A2 of the holding member 30 on an outer side than the range A1 out of the surface of the double-faced tape 32 on the mirror 4 side is arranged between the folded portion 22B of the frame 20 and the polarization plate 12B of the LCD panel 10 and is in a state of non-contact with other members. For example, a width of the gap S is 1 millimeter. An outer region F2 included in a range A3 of the holding member 30 that is on an outer side than the range A2 and that includes an outer edge of the double-faced tape 32 out of the surface of the double-faced tape 32 on the mirror 4 side contacts the folded portion 22B of the frame 20 and is connected (bonded) to the folded portion 22B. In the projected view from the direction orthogonal to the display surface 3PE, the outer region F2 is a region of the holding member 30 farther from the center of the LCD panel 10.

In this way, the holding member 30 is configured so that the inner region F1, the gap S, and the outer region F2 are arranged from the inner side to the outer side. That is, the holding member 30 is in a state where the gap S is formed between the inner region F1 connected to the LCD panel 10 and the outer region F2 connected to the frame 20 to separate the inner region F1 from the outer region F2.

(Function and Effect)

As described above, in the LCD module 3, the LCD panel 10 is connected to the frame 20 via the holding member 30. The holding member 30 is provided with the gap S between the inner region F1 connected to the LCD panel 10 and the outer region F2 connected to the frame 20. In the holding member 30, the double-faced tape 32 is bonded to the light-blocking film 31 having the elasticity and flexibility. Thereby, the holding member 30 is deformable. The LCD module 3 thereby enables the holding member 30 to absorb a deformation generated on the frame 20 and enables the holding member 30 to reduce a stress applied to the LCD panel 10 due to the deformation of the frame 20. It is thereby possible to suppress the LCD panel 10 from deforming and unevenness in display from occurring. Functions and effects are described below more specifically.

Figure 4:
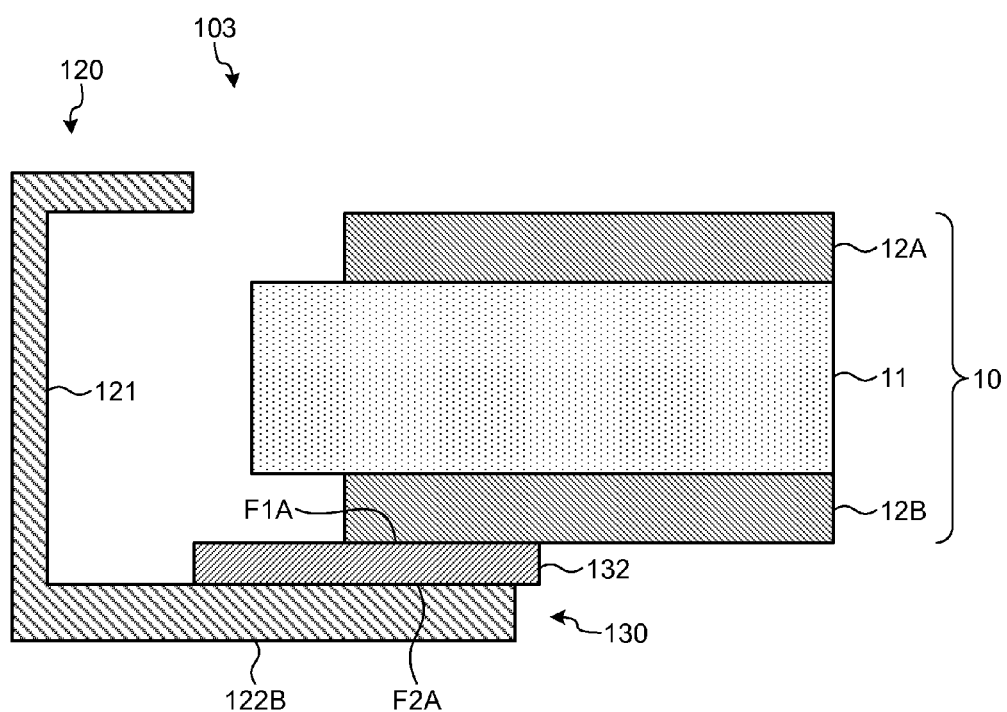
FIG. 4 is a cross-sectional view illustrating a display device according to a comparison.

FIG. 4 is a cross-sectional view illustrating a display device according to a comparative embodiment. FIG. 4 illustrates a cross-sectional shape at a position corresponding to that of FIG. 2. An LCD module 103 illustrated in FIG. 4 includes the LCD panel 10, a frame 120, and a holding member 130. The LCD panel 10 has a configuration as in the LCD panel 10 of the LCD module 3. In the frame 120, an inner end portion of a folded portion 122B connected to a wall portion 121 on the light source 2 side is located on an inner side than an outer end portion of the polarization plate 12B of the LCD panel 10. That is, in a projected view of the LCD module 103 from the direction orthogonal to the display surface, a part of the polarization plate 12B on the outer side overlaps a part of the folded portion 122B on the inner side.

The holding member 130 is disposed in a portion in which a part of the polarization plate 12B on the outer side overlaps a part of the folded portion 122B on the inner side. The holding member 130 is a sheet-shaped member to both surfaces of which an adhesive agent or a pressure sensitive adhesive agent (tackiness agent) is applied. The holding member 130 is connected with the polarization plate 12B by contacting a first region F1A thereof with the polarization plate 12B. The first region F1A is an inner region of a surface on the mirror 4 side. The holding member 130 is connected with the folded portion 122B by contacting a second region F2A thereof with the folded portion 122B. The second region F2A is an outer region of a surface on the light source 2 side.

As illustrated in FIG. 4, in a configuration in which the holding member 130 is connected to the portion in which the LCD panel 10 overlaps the frame 120, if the frame 120 deforms, the LCD panel 10 also deforms to follow a deformation of the frame 120. If the LCD panel 10 deforms, abnormal liquid crystal alignment or orientation possibly occurs in the LCD panel 10, and unevenness in display possibly occurs to the LCD panel 10.

On the other hand, in a case of the LCD module 3 according to the present embodiment, in the projected view from the direction orthogonal to the display surface, the holding member 30 is connected to the LCD panel 10 and the frame 20 with the gap S therebetween. With this configuration, in a case where the frame 20 deforms and even if the outer region F2 deforms to follow the deformation of the frame 20, the gap S of the holding member 30 can reduce the deformation gradually from the outer region F2 toward the inner region F1. That is, because the gap S can absorb the deformation generated in the outer region F2, the LCD panel 10 does not deform due to the deformation of the frame 20 and no abnormal liquid crystal alignment or orientation occurs in the LCD panel 10. Therefore, it is possible to suppress the unevenness in display from occurring to the LCD panel 10.

The frame 20 itself may be warped due to an error or the like during manufacturing. Accordingly, if an adhesive member 132 bonds the polarization plate 12B of the LCD panel 10 to the folded portion 122B of the frame 120 as illustrated in FIG. 4, a gap is generated between the frame 120 and the LCD panel 10, and light leakage possibly occurs from the gap.

On the other hand, in the LCD module 3 according to the present embodiment, the holding member 30 can adhere to or can be bonded to the polarization plate 12B and the folded portion 22B of the frame 20 with no gap since the holding member 30 has the flexibility, and the holding member 30 can prevent light leakage between the LCD panel 10 and the frame 20, since the holding member 30 also has the light blocking effect.

In the LCD module 3 according to the present embodiment, the LCD panel 10 can be connected to the frame 20 using only the sheet-shaped holding member 30. Thereby, the device can be formed thinner and lighter in weight. That is, it is unnecessary that the LCD panel 10 is sandwiched on both sides thereof, that is, the display surface side and the opposite surface side. Thereby, the frame 20 can be formed thinner. Furthermore, it is unnecessary to provide a mechanism for sandwiching the LCD panel 10 from its both sides, i.e. from the display surface side and the opposite surface side. Thereby, the frame 20 can be formed thinner also in this respect. The weight of the frame 20 can be also reduced, since such a mechanism is not required. Therefore, the device can be formed thinner and lighter in weight.

In the LCD module 3 according to the present embodiment, it is unnecessary to provide an overlap allowance on a peripheral edge of the LCD panel 10 for fixing the LCD panel 10 to the frame 20 and unnecessary to fix the LCD panel 10 to the frame 20 using a portion of this overlap allowance. Therefore, the LCD panel 10 can be formed smaller by as much as a region corresponding to the overlap allowance. It is thereby possible to manufacture more LCD panels 10 from a motherboard during manufacturing of the LCD panel 10.

The LCD panel 10 according to the present embodiment has a square shaped outline of the display surface. However, the outline is not limited to the square. The outline of the display surface or the LCD display panel may be formed as a rectangle. The outline is not limited to the rectangle but it may be a parallelogram, an ellipse, a circle, or a polygon. Similarly to the LCD panel 10, the frame 20 and the holding member 30 can be formed into various shapes. In the projected view of the LCD module 3 from the direction orthogonal to the display surface, it is necessary to provide a gap between a region where the holding member 30 is in contact with (connected with) the frame 20 and a region where the holding member 30 is in contact with (connected with) the LCD panel 10.

It is preferable to use a material having high heat resistance and high corrosion resistance as the light-blocking film 31 of the LCD module 3 according to the present embodiment. Accordingly, when the LCD module 3 is used in a head-up display such as the display device 1 according to the present embodiment, it is possible to prevent the light-blocking film 31 from being deteriorated or deformed due to heat.

In the aforementioned embodiment, the holding member 30 is formed from the light-blocking film 31 with the double-faced tape 32 attached thereon, so that the holding member 30 is connected to the LCD panel 10 and the frame 20 through the double-faced tape 32. However, the holding member 30 is not limited to the aforementioned embodiment. It is sufficient that the holding member 30 is connected to the LCD panel 10 and the frame 20. A material having adhesiveness or tackiness such as an adhesive agent or a tackiness agent may be applied to the light-blocking film 31 in place of the double-faced tape 32. The holding member 30 may be connected to at least one of the LCD panel 10 and the frame 20 by a machine mechanism such as screw. As the sheet-shaped member of the holding member 30, a metallic film such as aluminum tape may be used other than the film made of resin having the elasticity.

As described above, it is preferable that the holding member 30 is formed of a material more deformable, that is, a lower rigidity material than the frame 20. The holding member 30 can thereby absorb a deformation of the frame 20 more effectively and suppress a deformation of the LCD panel 10. Although the holding member 30 is preferably more deformable than the frame 20, a deformation of the LCD panel 10 can be suppressed even when the holding member 30 is less deformable than or as deformable as the frame 20, since a structure of connecting the holding member 30 to both the LCD panel 10 and the frame 20 with providing the gap S therebetween can absorb the deformation.

The frame 20 can be formed into various shapes. For example, the frame 20 may be formed without the folding portion 22A, or may be formed without the wall portion 21. Although the holding member 30 of the LCD module 3 according to the embodiment is provided on the surfaces of the LCD panel 10 and the frame 20 on the light source 2 side, the holding member 30 may be provided on the side of the mirror 4, that is, on the side of the display surface. The holding member 30 may be connected to a surface of the folded portion 22B of the frame 20 on the folded portion 22A side. The holding member 30 may be connected to an inner surface of the U-shaped frame 20.

According to the present disclosure, it is possible to prevent any deformation or warpage of the display surface of the display panel, even if the frame is warped or even if a gap is generated between the frame and the display panel. Thereby, it is possible to reduce the display unevenness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, in the aforementioned embodiment, the display panel for displaying an image is explained as the LCD panel, and the display module is explained as the LCD module. However, this is not exclusive. A display panel other than the LCD panel may be used in a display module. Also in this case, it is possible to suppress the deformation of the display panel and thereby suppress the occurring of the display unevenness.

The display module according to the present embodiment can be applied to an electronic apparatus in every field such as a car navigation system, a television apparatus, a digital camera, a notebook personal computer, a portable electronic apparatus such as a portable telephone, or a camcorder, other than the head-up display. In other words, the display module according to the present embodiment can be applied to an electronic apparatus in every field for displaying a video signal input from outside or a video signal generated inside as an image or a video. The electronic apparatus includes a control device that supplies the video signal to the display panel and that controls the display panel to operate.

[2. Configuration of Present Disclosure]

The present disclosure can employ the following configurations.

(1) A display module including:
a display panel configured to display an image on a display surface;
a frame having a shape configured to surround an outer edge of the display panel and having an opening formed in a region overlapping the display surface; and
a holding member having an inner region that is a region closer to a center of the display panel and an outer region that is a region farther from the center of the display panel, the inner region being connected to the display panel, the outer region being connected to the frame, and the inner region being separated from the outer region in a view projected from a direction orthogonal to the display surface.
(2) The display module according to (1), the holding member is more deformable than the frame.
(3) The display module according to (1), the inner region and the outer region of the holding member are provided on a same surface.
(4) The display module according to (1), the holding member is connected to a surface of the display panel opposite to the display surface.
(5) The display module according to (1),
the holding member includes
a light-blocking film configured to block light, and
an adhesive member which is provided on a surface of the light-blocking film and which bonds the display panel and the frame to the light-blocking film.
(6) The display module according to (5), wherein the adhesive member is a double-faced tape.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display module comprising:
a liquid crystal panel that is configured to display an image on a display surface and that has a supporting side surface opposite to the display surface;
a frame having a shape configured to surround an outer edge of the liquid crystal panel and having
an opening formed in a region overlapping the display surface,
a wall portion that has ends of a first wall end and a second wall end and that faces a side surface of the liquid crystal panel,
a first folded portion that has ends of a first outer end, which is connected to the first wall end, and an first inner end, which protrudes toward the side surface of the liquid crystal panel, and
a second folded portion that has ends of a second outer end, which is connected to the second wall end, and an second inner end, which protrudes toward the side surface of the liquid crystal panel; and
a holding member that has a holding surface that extends in a first direction parallel to the display surface and that faces the liquid crystal panel, the holding surface having
an inner region that is a region closer to a center of the liquid crystal panel in the first direction and that is connected to the supporting side surface of the liquid crystal panel,
an outer region that is a region farther from the center of the liquid crystal panel in the first direction and that is connected to the second folded portion, and
a middle region between the inner region and the outer region in the first direction,
wherein the liquid crystal panel is disposed on the holding surface of the holding member in the inner region,
wherein the frame is disposed on the holding surface of the holding member in the outer region,
wherein the middle region of the holding surface corresponds to a space between the liquid crystal panel and the frame in the first direction,
wherein the first inner end of the first folded portion is located outside an outer edge of the display surface viewed from a second direction vertical to the first direction,
wherein the second inner end of the second folded portion is located outside the outer edge of the supporting side surface viewed from the second direction.

2. The display module according to claim 1, wherein the holding member is more deformable than the frame.

3. The display module according to claim 1, wherein the holding member includes
a light-blocking film configured to block light, and
an adhesive member which is provided on a surface of the light-blocking film and which bonds the liquid crystal panel and the frame to the light-blocking film.

4. The display module according to claim 3, wherein the adhesive member is a double-faced tape.

5. The display module according to claim 1, wherein the liquid crystal panel and the frame are connected to the holding member except in the middle region of the holding member.

6. The display module according to claim 1, wherein the holding member has an opening in a region that overlaps the display surface of the liquid crystal panel viewed from the second direction to surround the outer edge of the liquid crystal panel.

* * * * *